Figure 1:
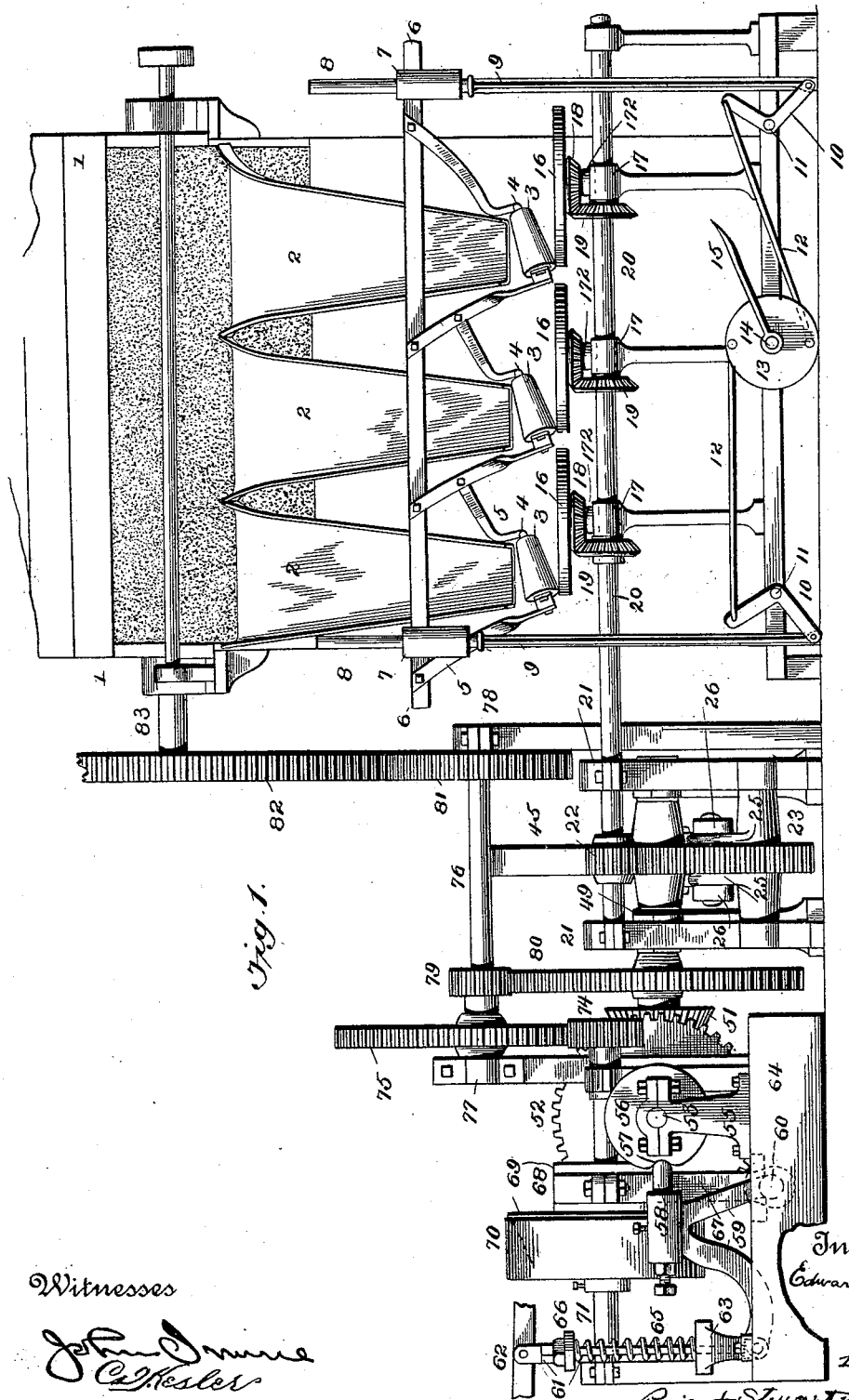

(No Model.) 4 Sheets—Sheet 1.

E. GOLDMAN.
MACHINE FOR SHAPING FLEECY MASSES.

No. 520,419. Patented May 29, 1894.

Witnesses

Inventor
Edward Goldman
By Price & Stuart
Attorneys (No Model.) 4 Sheets—Sheet 2.

E. GOLDMAN.
MACHINE FOR SHAPING FLEECY MASSES.

No. 520,419. Patented May 29, 1894.

Witnesses

Inventor
Edward Goldman
By Price & Stewart
his Attorneys (No Model.) 4 Sheets—Sheet 3.
E. GOLDMAN.
MACHINE FOR SHAPING FLEECY MASSES.

No. 520,419. Patented May 29, 1894.

Witnesses

Inventor
Edward Goldman
By Price & Steuart
his Attorneys (No Model.) 4 Sheets—Sheet 4.
E. GOLDMAN.
MACHINE FOR SHAPING FLEECY MASSES.
No. 520,419. Patented May 29, 1894.
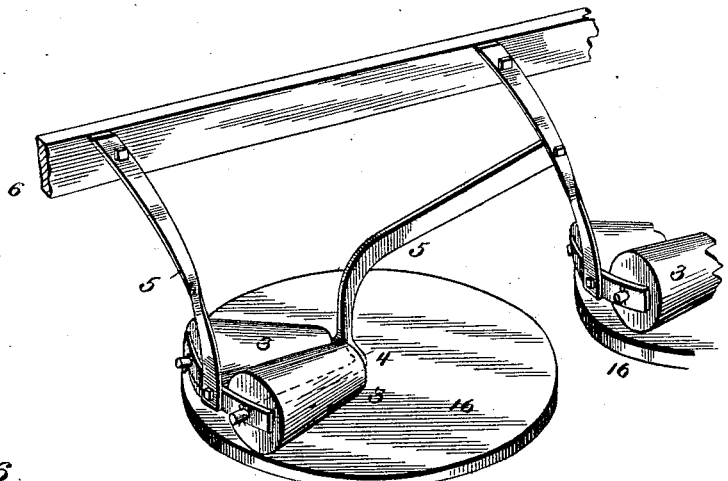
Fig. 5.
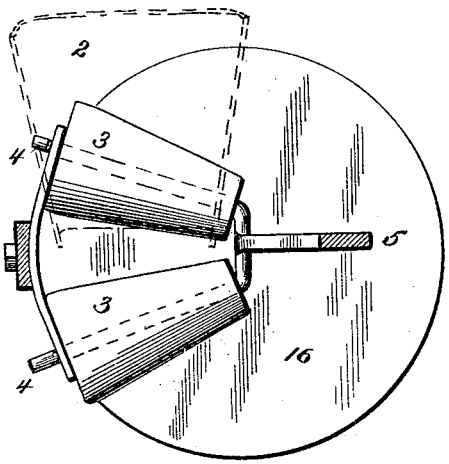
Fig. 6.
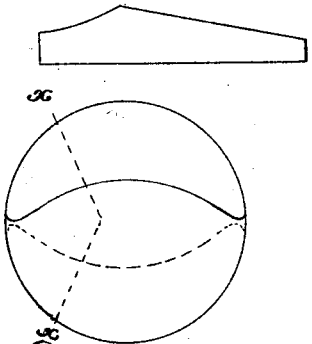
Fig. 7.
Fig. 8.
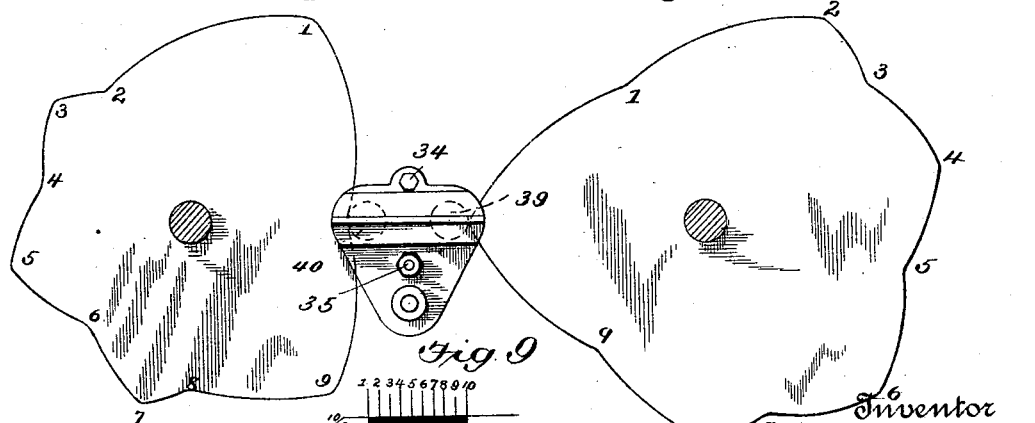
Fig. 9.
Witnesses
Inventor
Edward Goldman
By Price & Stewart
his Attorneys
THE NATIONAL LITHOGRAPHING COMPANY.
WASHINGTON, D. C.

UNITED STATES PATENT OFFICE.

EDWARD GOLDMAN, OF BALTIMORE, MARYLAND, ASSIGNOR TO THE EUREKA COAT PAD COMPANY OF BALTIMORE CITY, OF MARYLAND.

MACHINE FOR SHAPING FLEECY MASSES.

SPECIFICATION forming part of Letters Patent No. 520,419, dated May 29, 1894.

Application filed April 15, 1893. Serial No. 470,508. (No model.)

*To all whom it may concern:*

Be it known that I, EDWARD GOLDMAN, a citizen of the United States, and a resident of the city of Baltimore and State of Maryland, have invented certain new and useful Improvements in Machines for Shaping Fleecy Masses, of which the following is a specification.

My invention relates to a machine for shaping fleecy masses for use on the shoulders of coats. On the 15th day of March, 1887, Patent No. 359,441, was granted to me for a coat pad consisting of a homogeneous mass of fleecy material, crescent-shaped, and having its point of greatest thickness about one-third of its length from one extremity of the pad on the concave side and tapering from that point to a thin edge all around the convex edge. I also claimed the pad as covered with a coating of gelatinous material. In the manufacture of these pads a wad of cotton is first formed, circular in shape, but of uneven thickness. The machine which is the subject of this application is designed for the manufacture of these circular pads. From the circular pads when completed are cut two pads by means of a moon-shaped knife, the knives cutting the pads with such a relation to their unevenness of thickness as to produce a moon-shaped pad of the peculiar form described above. The moon-shaped pads are then placed between two pieces of material of the same shape; these are generally a stiffened cloth on one side and sized batting on the other and the whole stitched together to form a coat pad, after which they are sheared to give the pad an exact shape.

My invention claimed in this application consists of a machine in which carded cotton is fed from a card through chutes on to a revolving table, which is rotated first in one direction and then reversed, making a whole revolution, a portion of a revolution, and reverse, then a still smaller portion, and reverse, then one or more whole revolutions. The cotton is pressed upon the revolving table by a conical roller which works it up toward the center while keeping the edge thin. These motions are accomplished by a train of mechanisms which are new in their combination and application for the accomplishment of this result.

Figure 2:
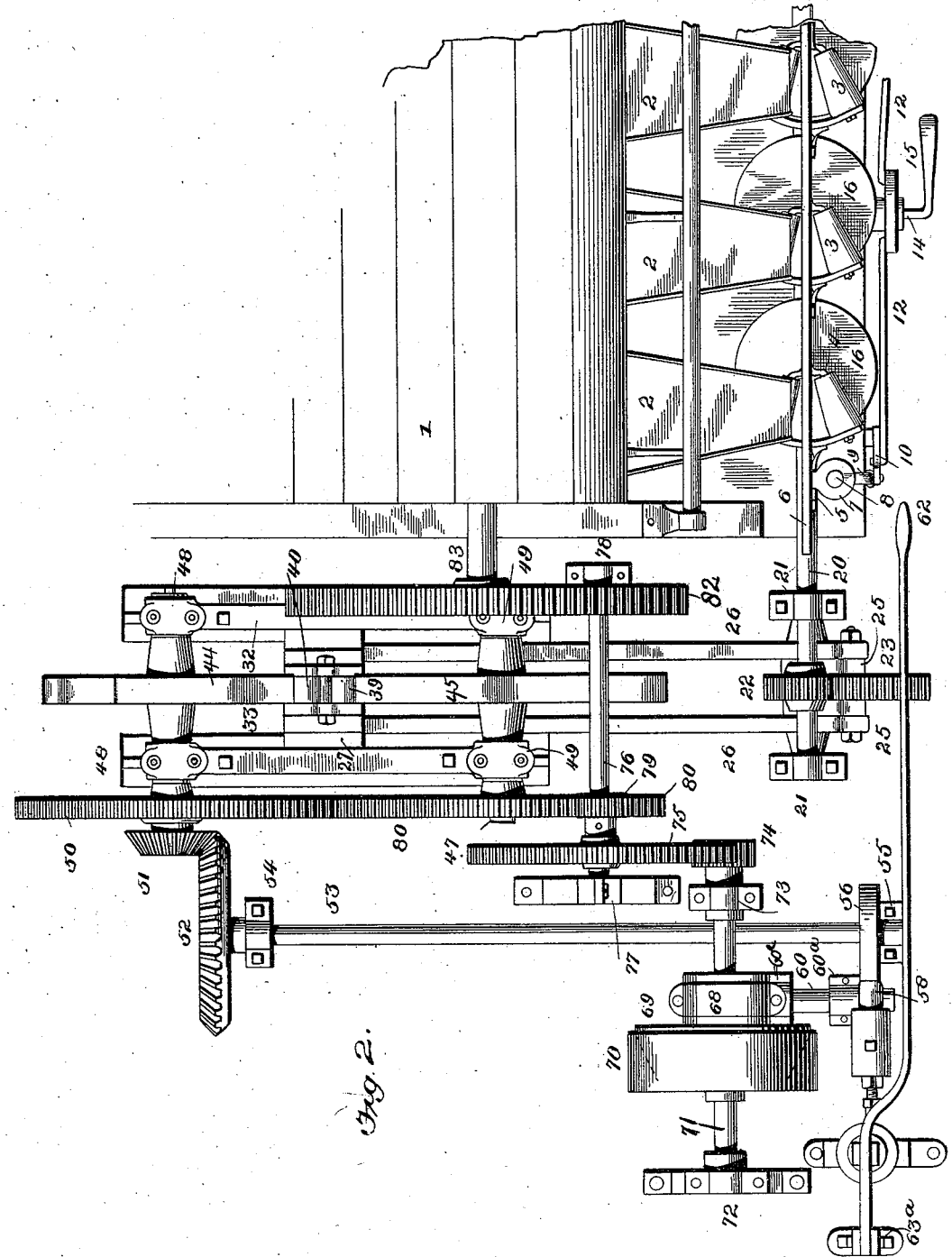
Figures 3, 4:
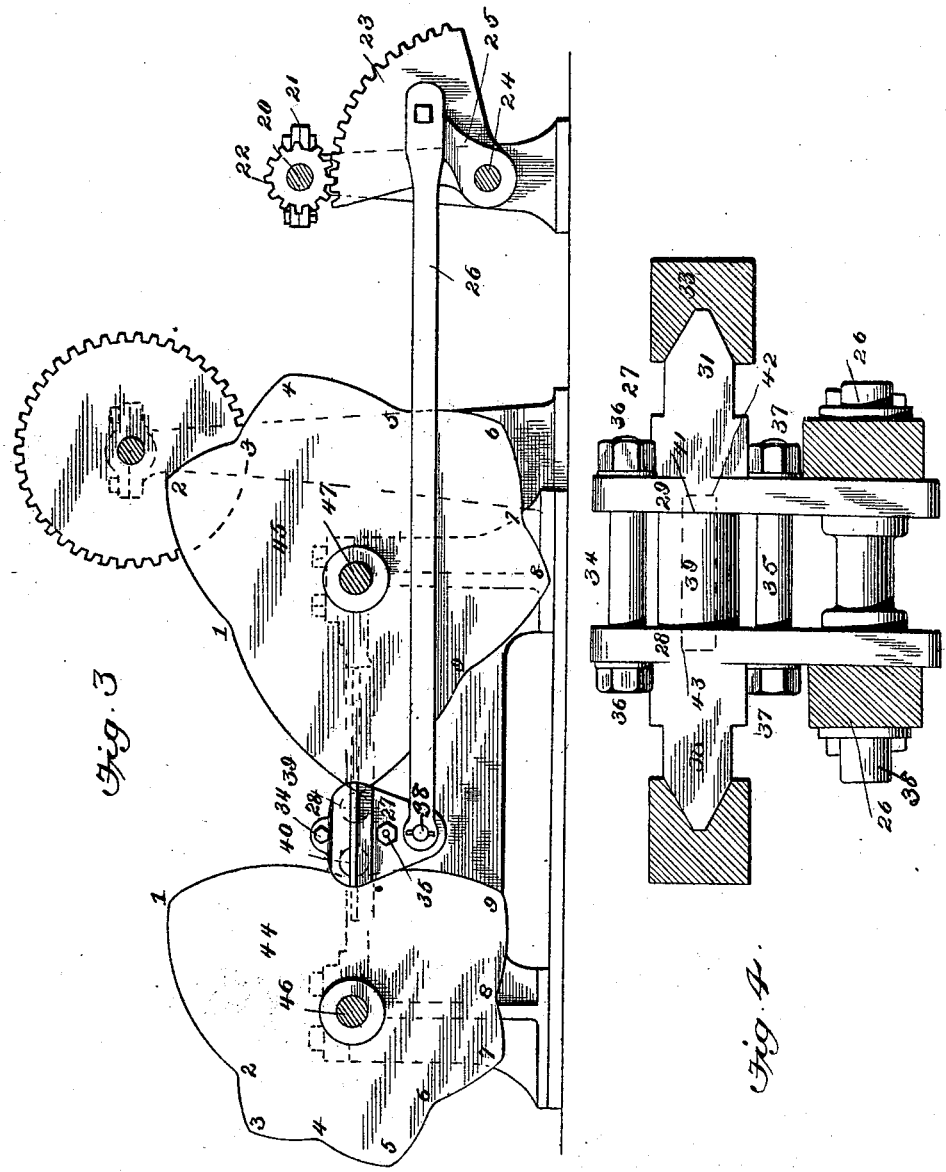

In the drawings Figure 1 is a front elevation of the pad machine and card; Fig. 2 a plan of same. Fig. 3 is a side elevation of the cams and reciprocating cross-head. Fig. 4 is a front elevation of the cross-head. Fig. 5 is a perspective view of the revolving table and rollers. Fig. 6 is a plan of same showing chute in dotted lines. Fig. 7 is a side elevation of circular pad when finished. Fig. 8 is a plan of the circular pad with the moon-shaped knife in position for cutting, the high part of pad being indicated by the line $x$—$x$. Fig. 9 is a graphic representation of the way in which the several layers of cotton are laid on the revolving table by which the pad is made.

Referring to Fig. 1, 1 is a card of the ordinary type in which the cotton is carded into a thin film.

2—2—2 are chutes in which the cotton is gathered and divided into three sections of equal size. When picked off of the card by the doffer the web of carded cotton traveling down the chutes 2—2—2 is delivered between the conical rollers 3—3 in each case as is shown in Fig. 6 as well as in Fig. 2 a plan of the revolving table and cones being shown therein.

3—3 are conical rollers mounted on the shafts 4—4 upon which they freely turn. The shafts 4—4 are held in frames in such position that the large ends of the conical rollers 3—3 will make contact with the edge of the revolving table 16, while the small ends will project toward the centers of the tables; the shafts 4—4 are inclined at an angle so as to cause the cones 3—3 to occupy an inclined position above the revolving tables.

5—5 is a framework in which the shafts 4—4 are secured. 6 is a cross-bar to which this frame-work is bolted.

7—7 are sleeves to which the bar 6 is secured. The sleeves 7—7 are mounted on vertical rods 8—8 which are bolted in the bed of the machine and stand vertically behind the rods 9—9.

9—9 are pitman rods connected at their upper ends to the sleeves 7—7 and at their lower ends to one arm of the bell-crank levers 10—10 which are pivoted at 11—11 in the frame of the machine. To the other ends of the bell-crank lever 10—10 are secured the rods 12—12 which are fastened at their opposite ends to studs in a disk 13 which is journaled upon a stud 14 set in the side of the base of the machine.

15 is a treadle or hand-lever secured to the disk 13 and by which it is revolved. It will be seen that when the treadle 15 is depressed the disk 13 will be rotated, the bell-crank 10—10 moved, the sleeve 7—7 pushed up by the pitman rods 9—9, and the cones 3—3 3—3 3—3 lifted off of the revolving tables.

16—16—16 are three revolving tables as shown in Fig. 1. I use three tables in front of each card; a less or a greater number might be employed in proportion to the size of the card used; the number is not a material part of my invention. The revolving table 16 consists of disks of metal provided on the under side at their centers with a bevel gear 18 in each case.

$17^2$—$17^2$ are studs rising from the top of the journal bearings 17—17—17 the standards of which rest upon the bed of the machine: these studs pass through holes in the centers of the gears 18—18—18 and upon them they are journaled.

19—19—19 are bevel-gears keyed to the shaft 20 and meshing with the bevel-gears 18—18—18 and by which the revolving tables 16—16—16 are turned. The shaft 20 is mounted in bearings 17—17—17 under the revolving table. It also turns in bearings 21—21 beyond the card and is connected with mechanism by which it is given the desired motion. Beyond the card 1 to the right the shaft 20 may be extended indefinitely so as to pass in front of any number of carding machines and operate any number of revolving tables similar to 16—16, giving them similar motions. Between the extreme bearings 21—21 there is keyed to the shaft 20 a pinion 22 which meshes with a segmental gear 23 which is journaled upon the shaft 24 and to which is connected a double crank 25—25 shown in Fig. 2. To the cranks 25—25 are connected the connecting rods 26—26 by which motion is communicated to the segmental gear 23 and to the pinion 22 and the shaft 20. On the other end the connecting rods 26—26 are secured to the cross-head 27.

27 is a cross-head mounted in guides 32—33 and reciprocating therein under the influence of cams 44—45; the construction of the cross-head is shown in Fig. 4. It consists of two plates 28—29 of metal preferably cast iron, on the sides of which are cast the projecting lugs which form slides 30—31 and which engage with the guides 32—33 and slide therein.

34—35 are bolts by which the plates 28—29 are held together. These bolts are larger in the center than at the ends so that shoulders are formed which bear against the interior faces of the plates 28—29 maintaining them at a proper and equal distance apart. These bolts are secured in position by the nuts 36—36 and 37—37.

38 is the cross-head pin to which the connecting rods 26—26 are secured and by which the motion of the cross-head is communicated to the connecting rods.

39—40 are two cam rollers mounted in the cross-head between the plates 28—29. I prefer to construct these rollers in the form of sleeves journaled upon a shaft 41—41. On the interior faces of the plates 28—29 are sockets 42—43 in which the shaft 41 rests, the sleeves 39—40 turning more or less freely upon these shafts.

44 and 45 are the cams by means of which reciprocating motion is given to the cross-heads 27. These consist of a number of points and depressions which will be hereinafter described and by which a motion of a special nature is given to the cross-head. The cam 44 is mounted upon a shaft 46; the cam 45 upon the shaft 47. These shafts are journaled in the bearings 48—48 and 49—49. On the extremity of the shaft 46, beyond the bearing 48 is keyed a gear 50 and beyond that on the same shaft a bevel-gear 51 which meshes with a bevel-gear 52 connected to the end of the shaft 53 mounted in the bearings 54—55. Upon the end of the shaft 53 near the bearing 55 is keyed a cam 56 which is circular in form but provided with a notch 57. 58 is a finger projecting from a lever 59 which bears upon the edge of the cam wheel 56 and engages the notch 57.

59 is a lever keyed to the rock shaft 60 which is mounted in bearings $60^a$—$60^a$. The rear end of the lever 59 projects upward vertically in the form of a rod 61 and passes through a bracket 63 which is bolted to the frame 64 of the machine. Surrounding the rod 61 of the lever 59 is a spring 65 which bears at the bottom upon bracket 63 and at the top upon the washer 66 which is secured to the rod 61. It will be observed from this structure that the pressure of the spring 65 is upward against the washer 66 forcing the rod 61 upward and the finger 58 against the edge of the cam 56.

62 is a hand-lever pivoted at $63^a$ and extending forward across the top of rod 61, to which it is secured, to the front of the machine where it stands in position to be moved by the hand of an operative. Upon the same rock shaft 60 to which is secured the lever 59 is also keyed the arm 67, upon the upper end of which there is a ring 68 which surrounds the portion 69 of the friction clutch. This portion of the clutch is mounted upon the shaft 71 on a feathered or squared portion so that it may be slid horizontally thereon, but will always turn the shaft 71 when it is rotated. The extremity of the portion 69 of the friction clutch is conical in shape and enters and fits a conical socket in the pulley 70 which is journaled upon the shaft 71 but moves freely thereon unless it is in engagement with the portion 69. The belt for driving the machine runs upon the pulley 70 and from it power is communicated to drive the apparatus being described. The shaft 71 is journaled in the bearings 72—73 and on the extremity of said shaft beyond the bearings 73 is keyed a pinion 74 which meshes with its gear 75 keyed upon the shaft 76 which is journaled in the bearings 77—78. Upon the same shaft 76 between the bearings 78 and gear 75 is keyed a pinion 79 which meshes with a gear wheel 80 keyed to the shaft 47 upon which is mounted the cam 45 and by which power is communicated to said shaft to rotate the cam. Upon the shaft 76 is also keyed a gear 81 which meshes with a gear 82 keyed to the shaft 83 of the card. The gears of this train are so arranged that the cams 44—45 will make one complete revolution while the cam 56 is making a complete revolution and the shaft 20 will be given its predetermined succession of motions in their regular order until completed, when the mechanism will be stopped by the finger 58 falling into the notch 57 of the cam 56. It will be seen that this stoppage is due to the releasing of the friction clutch 69—70. When the finger 58 falls in the notch 57 the shaft 60 will be rocked by the lever 59 and spring 65 sufficiently to cause portion 69 of the friction clutch to be withdrawn from the pulley 70, when the machine will stop. When it is desired to start the machine again this is done by simply depressing the lever 62 which will withdraw the pin 58 from the notch 57 and at the same time throw the portion 69 of the friction clutch into contact with the portion 70. The lever 62 may then be released because the notch 57 will have traveled beyond the end of the finger 58 which will rest upon the periphery of the cam 56. This will hold the friction clutch in contact with the pulley and the machine will run continuously until the finger 58 again falls into the notch 57 when the whole machine will stop and with it the feed of the card.

Referring now to Figs. 3 and 9, the cams 44—45 have been laid off in such a way as to cause the cross-head 27 to reciprocate back and forth in a certain order. This motion will be communicated to the shaft 20 and the rotating tables 16—16—16. The web of cotton from the card being fed continuously to the tables will be laid upon them in layers determined by their revolutions, the object being to form a circular pad which will have the form approximately shown in Fig. 7, which is a side elevation of a complete pad so that when cut by the moon-shaped knife as shown in Fig. 8, the pads will have the form described in the first portion of this specification. To accomplish this it is necessary that the tables should be made to revolve approximately as follows: forward a whole revolution, back four-tenths of a revolution, forward four-tenths of a revolution, back five-tenths of a revolution, forward five-tenths of a revolution, back five-tenths of a revolution, forward three-tenths of a revolution, back six-tenths of a revolution, forward eight-tenths of a revolution, back a whole revolution.

Fig. 9 shows a diagram of the way in which the layers of cotton are laid upon the table; the vertical lines representing portions of a revolution divided into tenths; the horizontal lines representing layers. From this it will be seen that the portion of the pad between the vertical lines 3—4—5 has the greatest number of layers, while the thickness is least at the tenth line and is two-tenths less than the whole thickness at the first line. This combination gives the desired result in the form of the pad.

It will be readily seen that a different combination of motions in the table might be accomplished by simply altering the curves of the cam in such a way as to give to the pad upon the table any desired form. It must also be borne in mind that the conical rollers 3—3 resting with the weight of their frame upon the edges of the tables and the soft carded web of cotton which is being fed on to the tables have the effect of forcing the cotton toward the center of the table and thinning the edge, thereby forming the cotton upon the table into a cone-shape, which, although not uniform in consequence of the unequal feeding of the web to the tables, is still much thinner at the exterior edge than in the center. This gives the desired shape from which to cut the pads.

When the finger 58 falls into the notch 57 and releases the friction clutch, the pads upon the tables are completed; the machine is stopped, the operative pressing upon the lever 15, raising the cone-frame and removing the circular pad from the tables 16—16—16, they being in approximately the form shown in Fig. 7. They are then taken to a cutting machine and placed below a reciprocating knife, moon-shaped, as shown in Fig. 8, with which they are cut into two moon-shaped pieces, care being taken that the knives shall cut the circular pads in such a position that the thick portion of the pad will be severed by one extremity of the moon-shaped knife, thus giving the shoulder pad the desired thickness at one end.

Having thus described my invention, what I claim, and desire to secure by Letters Patent, is—

1. In a machine for shaping fleecy masses, the combination of a revoluble table upon which a web of carded cotton is received, with means for imparting to said table a back and forth motion and means for varying the extent and succession of such motions according to a predetermined arrangement, and a cone mounted above the revoluble table in close proximity thereto and by which the pad of cotton formed upon the table is given shape.

2. In a machine for shaping fleecy masses, the combination of a revoluble table and means for imparting to it a back and forth motion and means for varying the extent and succession of such motions according to a predetermined arrangement, substantially as described.

3. In a machine for shaping fleecy masses, the combination of a revoluble table upon which a web of carded cotton is received, with means for imparting to said table a back and forth motion and means for varying the extent and succession of such motions according to a predetermined arrangement, a cone mounted above the revoluble table in close proximity thereto and by which the pad of cotton formed upon the table is given shape, and means for raising and lowering the cones.

4. In a machine for shaping fleecy masses the combination of a revoluble table, a cam or cams for imparting to said table a variable back and forth motion, and means connecting said cam or cams and table, substantially as described.

5. In a machine for shaping fleecy masses the combination of a revoluble table, a cam or cams for imparting a variable motion to the table, a train of gearing for imparting motion to the cams, and means for stopping said train of gearing when the cams imparting varying motion to the table have made one complete revolution and completed the predetermined series of motions of the table.

Signed at Baltimore city and State of Maryland, this 7th day of April, A. D. 1893.

EDWARD GOLDMAN.

Witnesses:
T. E. McCREADY,
ROBERT W. HAYS.